(12) United States Patent
Suleman

(10) Patent No.: US 11,720,407 B2
(45) Date of Patent: *Aug. 8, 2023

(54) RESOURCE PRE-FETCH USING AGE THRESHOLD

(71) Applicant: Google LLC, Mountain View, CA (US)

(72) Inventor: Dani Suleman, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,611

(22) Filed: Apr. 15, 2022

(65) Prior Publication Data

US 2022/0237042 A1 Jul. 28, 2022

Related U.S. Application Data

(63) Continuation of application No. 16/545,354, filed on Aug. 20, 2019, now Pat. No. 11,307,897, which is a
(Continued)

(51) Int. Cl.
*G06F 9/50* (2006.01)
*G06F 16/951* (2019.01)
*G06F 9/48* (2006.01)

(52) U.S. Cl.
CPC .......... *G06F 9/5027* (2013.01); *G06F 9/4881* (2013.01); *G06F 9/5022* (2013.01); *G06F 16/951* (2019.01)

(58) Field of Classification Search
None
See application file for complete search history.

(56) References Cited

U.S. PATENT DOCUMENTS

| 6,012,087 A | 1/2000 | Freivald et al. |
| 7,908,336 B2 * | 3/2011 | Carlson ............... G06F 16/9574 709/213 |

(Continued)

FOREIGN PATENT DOCUMENTS

WO WO 2017/074359 5/2017

OTHER PUBLICATIONS

Ju et al.; "Improvement of Page Ranking Algorithm Based on Timestamp and Link"; School of Computer and Telecommunication Engineering, Jiangsu University; IEEE 2008 (Ju_2008.pdf; pp. 36-40) (Year: 2008).*

(Continued)

*Primary Examiner* — Hiren P Patel
(74) *Attorney, Agent, or Firm* — Brake Hughes Bellermann LLP

(57) ABSTRACT

Methods, systems, and apparatus, including computer programs encoded on a computer storage medium, for identifying a set of resources in response to crawling multiple webpages that use at least one resource in the set. For each resource in the set, a system determines an age of the resource using a timestamp for the resource. The system determines a pre-fetch measure of the resource based on the age of the resource and usage information that describes use of the resource at a webpage. The system selects a first resource from the set based on the pre-fetch measure and determines whether a respective age of the selected first resource exceeds a threshold age. The system generates an index entry for a pre-fetch index. The index entry includes a command to pre-fetch the first resource based on a determination that the respective age of the first resource exceeds the threshold age.

13 Claims, 5 Drawing Sheets

Related U.S. Application Data continuation of application No. PCT/US2018/000361, filed on Aug. 20, 2018.

(56) References Cited

U.S. PATENT DOCUMENTS

| | | | |
|---|---|---|---|
| 8,001,462 B1 | 8/2011 | Kupke et al. | |
| 8,341,245 B1* | 12/2012 | Roskind | H04L 67/5681 |
| | | | 709/224 |
| 8,423,885 B1* | 4/2013 | Kupke | G06F 16/951 |
| | | | 707/711 |
| 8,433,719 B1 | 4/2013 | Choc | |
| 8,666,964 B1* | 3/2014 | Alpert | G06F 16/951 |
| | | | 707/709 |
| 8,935,480 B1 | 1/2015 | Chien | |
| 8,984,048 B1 | 3/2015 | Maniscalco et al. | |
| 9,756,108 B2* | 9/2017 | Jain | H04L 67/5681 |
| 9,792,336 B1* | 10/2017 | Burns | G06F 16/24578 |
| 10,387,522 B2* | 8/2019 | Lepeska | G06F 16/9574 |
| 10,735,548 B1 | 8/2020 | Lepeska | |
| 11,307,897 B2* | 4/2022 | Suleman | G06F 9/4881 |
| 2002/0103778 A1 | 8/2002 | Saxena | |
| 2003/0046311 A1* | 3/2003 | Baidya | G06F 16/954 |
| 2004/0049541 A1* | 3/2004 | Swahn | G06F 16/9562 |
| | | | 709/250 |
| 2005/0138143 A1* | 6/2005 | Thompson | G06F 16/9574 |
| | | | 709/218 |
| 2005/0165778 A1* | 7/2005 | Obata | G06F 16/951 |
| | | | 707/999.005 |
| 2006/0069663 A1* | 3/2006 | Adar | G06F 16/951 |
| 2006/0277167 A1* | 12/2006 | Gross | G06F 16/951 |
| 2006/0294223 A1* | 12/2006 | Glasgow | H04L 67/56 |
| | | | 709/224 |
| 2007/0198634 A1 | 8/2007 | Knowles | |
| 2012/0297291 A1 | 11/2012 | Fainberg et al. | |
| 2014/0033019 A1 | 1/2014 | Zhang | |
| 2014/0379840 A1* | 12/2014 | Dao | H04L 67/5681 |
| | | | 709/219 |
| 2015/0082438 A1 | 3/2015 | Prieto Alvarez | |
| 2015/0350370 A1* | 12/2015 | Lepeska | G06F 16/957 |
| | | | 709/219 |
| 2017/0139880 A1 | 5/2017 | Agostino | |
| 2017/0169031 A1 | 6/2017 | De Barros et al. | |
| 2017/0359402 A1* | 12/2017 | Eastham | G06F 16/9566 |
| 2018/0191764 A1* | 7/2018 | Chawla | G06F 16/951 |
| 2018/0248970 A1 | 8/2018 | Lepeska | |
| 2018/0285327 A1 | 10/2018 | Mahkovec | |
| 2020/0004889 A1 | 1/2020 | Mathur | |
| 2020/0089714 A1 | 3/2020 | Melnik | |
| 2021/0099545 A1 | 4/2021 | Pattabirannan | |
| 2021/0200767 A1* | 7/2021 | Periyathambi | G06F 16/9558 |

OTHER PUBLICATIONS

Brian D. Davison; "Predicting Web Actions from HTML Content"; ACM Jun. 15, 2002; (davison 2002.pdf; pp. 159-167) (Year: 2002).

Eden et al., "Web latency reduction via client-side prefetching," 2000 IEEE International Symposium on Performance Analysis of Systems and Software, Apr. 2000, 8 pages.

EP Office Action in European Application No. 18786443.4, dated Jul. 26, 2021, 8 pages.

Grigoril [online], "Google mobile search is getting faster—to be exact, 100-150 milliseconds faster!" Dec. 2014, Retrieved on Dec. 18, 2018, retrieved from URL<https://plus.google.com/+IlyaGrigori k/posts/ahSpGgohSDo>, 3 pages.

PCT International Preliminary Report on Patentability in International Application No. PCT/US2018/000361, dated Mar. 4, 2021, 9 pages.

PCT International Search Report and Written Opinion in International Appln. No. PCTAJS2018/000361, dated Jan. 8, 2019, 15 pages.

SlahEldeen et al; "Carbon Dating the Web: Estimating the Age of Web Resources"; IW3C2 May 2013; (Hany 2013.pdf; pp. 1075-1082) (Year: 2013).

Extended European Search Report for European Application No. 23164931.0, dated May 30, 2023, 9 pages.

* cited by examiner

RESOURCE PRE-FETCH USING AGE THRESHOLD

CROSS REFERENCE TO RELATED APPLICATIONS

This application is a continuation of U.S. application Ser. No. 16/545,354, filed Aug. 20, 2019, which is a continuation of International Application No. PCT/US2018/000361 filed on Aug. 20, 2018, the contents of which are incorporated herein by reference in their entirety.

BACKGROUND

This specification relates to computing devices for testing changes to data used in production computer systems.

The Internet provides access to a wide variety of information. For example, digital image files, video and/or audio files, as well as web page resources for particular subjects or particular news articles, are accessible over the Internet. Regarding web page resources, many of these resources are designed to facilitate the performing of particular functions, such as banking, booking hotel reservations, shopping, etc., or to provide information, such as online encyclopedias, movie databases, news, etc.

A variety of search engines are available for identifying particular resources accessible over the Internet. These search engines crawl and index the various web page resources. The search engines then use the indexes to determine which resources are most responsive to search queries and provide search results that link to the resources in response to the queries.

SUMMARY

Methods, systems, and apparatus, including computer programs encoded on a computer storage medium, for identifying a set of resources in response to crawling multiple webpages that use at least one resource in the set. A computing system includes a large dataset or data corpus that is populated with information about various webpages and resources used at the webpages. The data corpus is populated when the multiple webpages are crawled to identify the set of resources. For each resource in the set, the system determines an age of the resource using a timestamp for the resource that is obtained from information in the data corpus. The system determines a pre-fetch measure of each resource based on a respective age of each resource and usage information that describes use of the resource at a webpage.

The system can select a particular resource from the set based on the respective pre-fetch measure of the particular resource and determine whether a respective age of the selected resource exceeds a threshold age. The system generates an index entry for a pre-fetch index that can include a listing of resources and corresponding index entries for each resource. The index entries can include a command to pre-fetch a particular resource based on a determination that a respective age of the particular resource exceeds the threshold age. The system uses the command included in the index entry at the pre-fetch index to generate a pre-fetch instruction for a resource that can be included in a search result that references the resource. Then when a client device submits a request to a webpage referenced by the search result, the client device will also issue a pre-fetch request for the resources without having to wait to process the webpage.

One aspect of the subject matter described in this specification can be embodied in a computer-implemented method, including, identifying a set of resources in response to crawling multiple webpages, each resource in the set of resources being a component of a webpage in the multiple webpages, and, for each resource in the set of resources: determining an age of the resource using a timestamp for the resource that indicates a time that a webpage of the multiple webpages was previously crawled to identify the resource as a component of the webpage, determining whether an age of the resource exceeds a threshold age, and, for each respective resource that is determined to have an age that exceeds the threshold age, generating an index entry in a pre-fetch index, the index entry including a command to pre-fetch the respective resource based on the determination that the age of the respective resource exceeds the threshold age, where at least one index entry is generated at the pre-fetch index.

These and other implementations can each optionally include one or more of the following features. For example, in some implementations, the method further includes: for each resource in the set of resources: determining a pre-fetch measure of the resource based on the age of the resource and usage information that describes use of the resource by one or more of the multiple webpages; and wherein index entries are generated only for resources which are determined to have a pre-fetch measure that exceeds a threshold measure and an age that exceeds the threshold age.

In some implementations, determining the pre-fetch measure of the resource includes: obtaining the usage information that describes the use of the resource by the one or more webpages; and determining a position of the resource at a webpage using the obtained usage information, wherein the webpage is not included in the multiple webpages that are crawled to identify the set of resources.

In some implementations, determining the position of the resource includes: providing, to a rendering system, program code for rendering a first webpage from among the multiple webpages that are crawled to identify the set of resources; obtaining usage information that describes use of the resource by a second webpage that is rendered using the rendering system; and determining the position of the resource relative to at least one element that is viewable at the second webpage.

In some implementations, the rendering system is external to a domain server that hosts the first webpage; and the second webpage is a duplicate of the first webpage based on the program code being a copy of the actual program code used to render the first webpage. In some implementations, determining the pre-fetch measure of the resource includes: determining a measure of stability of the resource based on a rate at which an attribute of the resource changes during a predefined time period; and determining the pre-fetch measure of the resource based on the determined measure of stability of the resource.

In some implementations, the pre-fetch measure indicates whether the resource is a candidate for pre-fetching and the method further includes: using the command included in the index entry at the pre-fetch index to pre-fetch a first resource when a client device submits a request to a webpage that uses the first resource that is determined to have an age that exceeds the threshold age.

In some implementations, determining a pre-fetch measure of the first resource includes: determining a percentage of webpages from among the multiple webpages that use the first resource to render a digital component at a web browser that loads the webpage; and determining whether the percentage of webpages exceeds a threshold percentage. In some implementations, the method further includes: determining whether the age of the first resource exceeds the threshold age in response to determining that the percentage of webpages exceeds the threshold percentage.

In some implementations, determining the age of the resource includes: obtaining a first timestamp for the resource based on a first instance of crawling the multiple webpages to identify the set of resources; obtaining a second timestamp for the resource based on a second instance of crawling the multiple webpages to identify the set of resources; and determining the age of the resource by determining a delta between the first and second timestamps.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. This document describes techniques for reducing latency that can occur after a user interacts with a web-link, e.g., a uniform resource locator (URL), to access a webpage. For example, the techniques can be used to speed up arriving at a website that includes a collection of individual webpages. To reduce the latency and speed up webpage navigation, respective index entries are generated for each resource in the set. The index entries can include commands for pre-fetching certain resources based on each resource having satisfied certain freshness and stability criteria. The described techniques therefore improve existing methods for accelerating access to certain online content.

The techniques can represent a specific set of computer-implemented rules that provide a standardized method of efficiently processing a large data corpus to identify resources, processing data that describes use of the resources at a webpage, and generating commands for pre-fetching the resources to speed up accessing a website that uses the resources. As such, the described technology improves the efficiency of the computer system operation, which is an improvement to the computer system itself.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
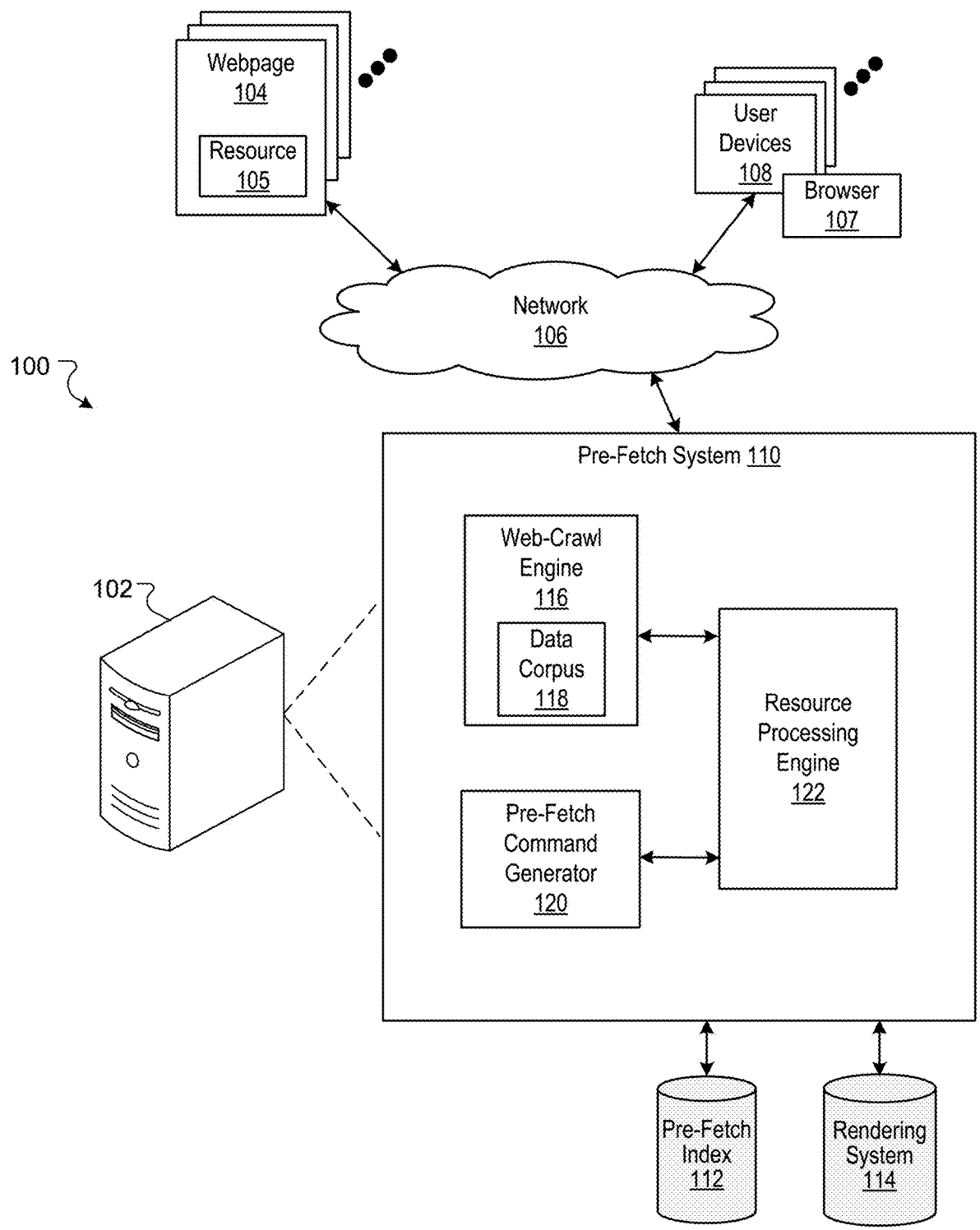
FIG. 1 shows a block diagram of an example system for prefetching resources.

This document describes techniques for reducing latency that can occur after a user interacts with a web-link, e.g., a uniform resource locator (URL), to access a webpage. The webpage can be a page hosted by a website and that displays content including items of media content or digital components that are hosted at another location (such as another webpage or website) and which must therefore be fetched from the other location. The digital components may take any form. A user may click on a link embedded at a digital component to access a second webpage, such as a landing page hosted by another website.

In general, graphical content of a webpage can be rendered using the hypertext markup language (HTML). A webpage, such as a search results page, may contain many web-links to different websites or landing pages. Scripted commands associated with the HTML for a website can be used to speed up navigation to the website. For example, a pre-fetch command can be processed by a web-browser to pre-fetch a resource used by a webpage requested by a web browser. Prefetching or caching the resource can provide a faster response when a client device attempts to access a landing page. However, it is often difficult to assess efficiently which resource (used by a website) to pre-fetch to achieve reliable improvements in the response time for when a user clicks on a URL linked to the website. Automatic prefetching or caching of resources that are no longer used by a webpage wastes bandwidth and reduces the speed with which the requested webpage is rendered.

The described techniques may involve using a special-purpose hardware computer system, or data processing apparatus, to identify a set of resources in response to the system crawling multiple webpages that use at least one resource in the set. The system determines an age of a resource. Based on the determined age, the system can also determine a pre-fetch measure of the resource. In some implementations, the system determines the pre-fetch measure based on usage information that describes use of the resource at one or more webpages. For example, the usage information can include parameter values indicating one or more of: i) a freshness of the resource; ii) a breadth of the resource; iii) a position of the resource at a webpage; or iv) a measure of stability for the resource. Some implementations determine a stability of a resource used at multiple different websites and use the determined stability to generate a pre-fetch index, or an index entry for an existing pre-fetch index, that includes a command for pre-fetching the resource.

The age and pre-fetch measure of a resource are used to determine if a resource is worthy of pre-fetching. For a given resource in a set, the system is configured to analyze webpages that use the resource and timestamps for when the system crawled the webpages to obtain the usage information about the resource. For the given resource, the system determines whether a respective age of the resource exceeds a threshold age. The system then generates a pre-fetch index that includes a command to pre-fetch the given resource based on a determination that the age of the resource exceeds the threshold age.

Hence, the system is configured to generate a pre-fetch index that includes a command for pre-fetching only resources that are sufficiently fresh and, optionally, stable. In some cases, these improvements and advantages are realized based at least on an indication of the age and/or stability of the resource. By using the age threshold and/or other usage information about a resource, the system can avoid prefetching resources that change frequently, thereby conserving system bandwidth and processor utilization which translates to an overall improvement to the operation of the hardware computer system. Moreover, the frequency of operations of rebuilding or modifying the pre-fetch index is also reduced, which also reduces system processing requirements.

FIG. 1 shows a block diagram of an example system 100 for pre-fetching one or more resources. A publisher website can be formed from multiple webpages 104. Each webpage includes one or more web resources 105 that can be associated with a domain and hosted by at least one server in one or more locations. Generally, a publisher website is a collection of web pages formatted in hypertext markup language (HTML) that can contain text, images, multimedia content, and programming elements. Each webpage 104 of a web site can be maintained by a content publisher, which is an entity that controls, manages and/or owns the website or webpages 104.

A webpage resource 105 can be a component or constituent part of a webpage that is used or processed at a webpage 104 to provide content over the network 106. In some implementations, resources 105 are processed using an example web-browser 107 of a client or user device 108 when the webpage 104 is loaded at the user device 108. A user device 108 is an electronic device that is under the control of a user. A user device 108 is typically capable of requesting and receiving webpage resources 105 using a native application, such as a web-browser 107, over the network 106. Example user devices 108 include personal computers, laptop computers, mobile communication devices, tablet computers, smartphones, smart televisions, e-notebook devices, content streaming devices, or related electronic devices.

A resource 105 is associated with a resource address, e.g., a uniform resource locator (URL) that is linked to a website or webpage that uses the resource. Web resources 105 may be HTML pages or component parts of an HTML page, or document, that are located or positioned adjacent other elements of the HTML document. For example, a resource 105 can be a snippet of code, such as JavaScript or cascading style sheets (CSS), at a particular location of the HTML document to control or manage how content is rendered at the document. For example, data for a CSS can describe how HTML elements are to be displayed on screen, paper, or in other media. In some cases, a CSS is configured to simultaneously control a layout of multiple web pages 104 for a website.

In other implementations, a resource 105 can correspond to other data items, such as image files, video files, audio files, and feed sources. Some resources 105 may include embedded information, e.g., metadata and hyperlinks, and/or embedded instructions, e.g., client-side scripts. The resources 105 may be uniquely configured for use at webpages 104 that are designed for desktop environments or mobile environments.

System 100 includes a computing server 102. In some implementations, server 102 is a special-purpose hardware computer system that uses a specific set of computer-implemented rules to determine resources 105 for pre-fetching to speed up accessing webpages that use the resources 105. Computing server 102 can include processors, memory, and data storage devices that collectively form one or more sub-systems or modules of server system 102. The processor microchips process instructions for execution at server system 102, including instructions stored in the memory or on the storage device to display graphical information for an example interface (e.g., a user interface 106). Execution of the stored instructions can cause one or more of the actions described herein to be performed by server system 102 or production system 104.

Hardware and software components of server 102 can form a pre-fetch system 110. Pre-fetch system 110 includes a web crawler 116 that obtains data for building a data corpus 118. Pre-fetch system 110 also includes a pre-fetch command generator 120 and a resource processing engine 120.

Web crawler 116 is configured to crawl webpages using addresses (e.g., Uniform Resource Locators (URLs)) of links to websites that include a collection of webpages. The webpages are crawled to identify resources 105 and usage information that describes use of the resource 105 at a webpage. For each address on the list, the web crawler may visit the webpage (e.g., associated with the address) and crawl or analyze an HTML, document that is used to render content at the webpage. The web crawler 116 may identify outgoing links, resources 105, time stamp and other usage information within the crawled document. The web crawler 116 extracts, copies, or otherwise obtains the usage information associated with the document and stores this information as a data corpus 118.

Command generator 120 is configured to generate a pre-fetch command that is processed by system 100 to pre-fetch resources 105 that satisfy one or more criteria. In some implementations, command generator 120 generates the pre-fetch command based on information obtained from data corpus 118 by way of processing engine 122. Command generator 120 can also generate an index entry that includes the pre-fetch command processed to pre-fetch resources 105 that satisfy certain criteria.

Processing engine 122 accesses data corpus 118 to obtain usage information that describes use of one or more resources 105 at a webpage. Processing engine 122 analyzes or processes the usage data to compile and provide information for generating a pre-fetch command in response to determining that certain criteria is satisfied. The criteria can include a determined age of a resource 105 and a determined pre-fetch measure of a resource 105 (described below). The criteria can be satisfied in response to system 100 determining that: i) the pre-fetch measure of a resource 105 exceeds a threshold pre-fetch measure, ii) the age of a resource exceeds a threshold age, or both. The age threshold can be a numerical value that defines some predefined period of time that a particular version of a resource 105 has been used at a webpage. The pre-fetch threshold can be a numerical value that corresponds to parameters for a resource 105. The compiled information is provided to command generator 120 to generate the index entry that includes the command to pre-fetch a resource 105. The index entry is stored at pre-fetch index 112 along with other data that can be used to execute a pre-fetch command.

The system 100 uses processing engine 120 to access usage information for a resource 105 stored at data corpus 118. As described in more detail below with reference to FIG. 3, processing engine 120 determines an age of a resource 105 in response to analyzing the usage information for the resource 105. The processing engine 120 can also determine a pre-fetch measure of the resource in response to analyzing the usage information for the resource 105. In some implementations, the processing engine 120 determines the pre-fetch measure based on parameters in the usage information that describes use of the resource at one or more webpages.

For example, the usage information can include parameter values indicating one or more of: i) a freshness of the resource; ii) a breadth of the resource; iii) a position of the resource at a webpage; or iv) a measure of stability for the resource. Parameters, and their corresponding data values that define a pre-fetch measure, can indicate whether a resource 105 is a candidate for pre-fetching. A resource 105 that is fresh (according to a freshness determination) can have attributes such as a more recent timestamp or newer CSS version, whereas relevant or critical resources 105 are resources that are used by some or all webpages in a group of webpages crawled using web crawler 116.

A measure of stability for the resource indicates whether a publisher or content provider is changing attributes of resources so often that pre-fetching the resource 105 would be wasteful. Example attributes can be certain coded instructions that are embedded in JavaScript used at a webpage 114 or a certain version of CSS used at the webpage. Hence, in some implementations, determining a pre-fetch measure of a resource 105 includes processing engine 120 determining a measure of stability of a resource 105 based on a rate at which an attribute of the resource changes during a pre-defined time period. Processing engine 120 determines the pre-fetch measure of the resource based on the determined measure of stability of the resource.

The pre-fetch system 110 can determine a pre-fetch measure based on a computed position of a resource 105 at a webpage 104. For example, the pre-fetch system 110 can be configured to interact with a rendering system 114 to determine the position of the resource 105 based on the usage information for the resource 105 obtained from data corpus 118. In some implementations, the rendering system 114 renders an alternate or duplicate webpage (second webpage) that is not included in the multiple webpages 104 (first webpage) that are crawled to identify the set of resources 105. For example, the processing engine 122 provides program code to rendering system 114 to render at least one webpage from among the multiple webpages 104 that are crawled using web crawler 116. In some implementations, the second webpage is a duplicate of the first webpage based on the program code being a copy of the actual program code used to render the first webpage.

The rendering system 114 can be external to a domain server that hosts the first webpage. System 100 obtains new usage information (e.g., resource layouts) that describes how a resource 105 is used, positioned, or located when rendered at a webpage that is a duplicate (or a substantial duplicate) of a webpage 104. Processing engine 122 exchanges data communications with the rendering system 114 to determine the position of the resource relative to at least one element that is viewable at the duplicate webpage. The position or location of a resource 105 at a webpage 104 can correspond directly to a positional value of the resource 105.

Figure 2:
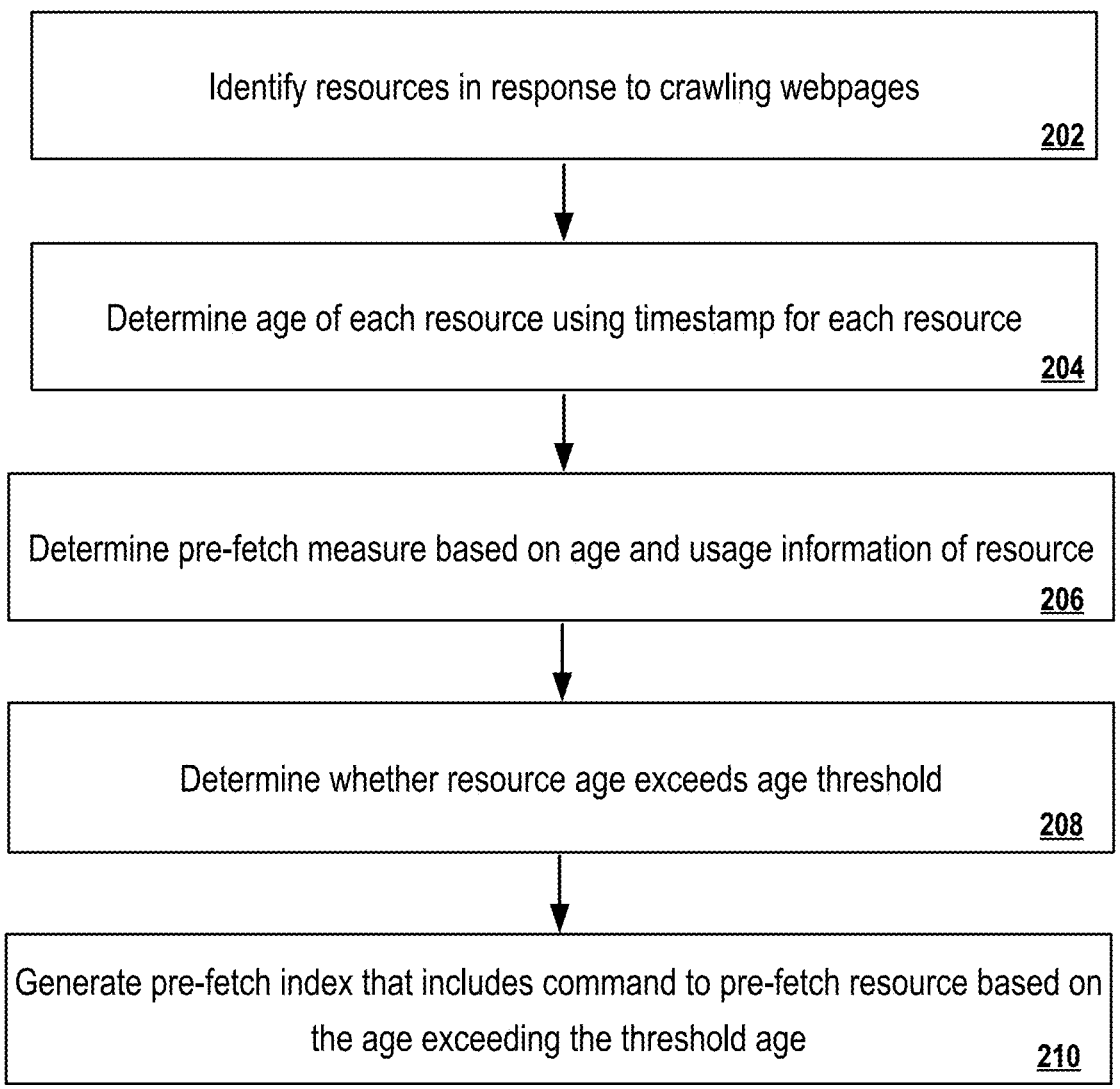
FIG. 2 shows a flowchart of an example process for prefetching resources.

FIG. 2 shows a flowchart of an example process 200 for prefetching resources. Process 200 can be performed using the devices and systems described in this document. In some implementations, steps of process 200 are enabled by programmed instructions that are executable by processors and memory of these devices and systems.

Referring now to process 200, system 100 identifies a set of resources in response to crawling multiple webpages (202). For example, system 100 can use crawler engine 116 to crawl multiple webpages to identify a particular resource 105 as well as to obtain certain information about the resource 105 that is used at each webpage 104. Each resource 105 in the set of resources can be a component of at least one of the webpages in the multiple webpages 104. In some cases, each webpage 104 of the multiple webpages uses at least one of the resources 105 in the set of resources to render graphical content at the webpage 104.

For each resource 105 in the set of resources, system 100 can determine a respective age of each resource 105 using one or more timestamps for the resource (204). Timestamps for a resource 105 indicate a time that the webpage 104 was previously crawled by system 100 to identify the resource 105 as a component of the webpage 104. For each resource 105 in the set, system 100 also determines a respective pre-fetch measure of each resource 105 based on the respective age of the resource and usage information that describes use of the resource 105 by one or more webpages (206). System 100 is configured to determine whether a pre-fetch measure of a resource exceeds a threshold pre-fetch measure. For example, a pre-fetch measure can be defined by one or more parameters, and corresponding values of the parameters, that are extracted from the usage information that describes use of the resource 105 at a group of webpages 104.

System 100 is configured to obtain parameter data from the data corpus 118 and analyze values for discrete parameters in the data that define a pre-fetch measure. The system 100 analyzes the parameter values to determine whether a resource 105 is a candidate for pre-fetching using components of system 100. For example, a pre-fetch measure can be defined by one or more of a breadth parameter, a freshness parameter, and a stability parameter.

The breadth parameter of a resource 105 is based on a quantity of webpages 104 that include the resource 105 as a component part of the webpage. In general, the more webpages that use the resource, the greater the value of the breadth parameter will be. For each resource, the system can determine, from the code of each webpage, how many webpages reference the resource. In some implementations, the breadth parameter provides a measure of relevance of a resource. For example, if a particular resource 105 is used across multiple pages then the resource has deep breadth and is particularly relevant resource 105.

The freshness parameter corresponds, in part, to an age of a resource 105, and indicates the most recent time stamp obtained for the resource 105 in response to crawling a website that uses the resource. The stability parameter indicates a measure of resource stability and corresponds to a rate at which a website 104 changes or modifies an attribute (e.g., a version) of a resource 105 used at the website.

System 100 obtains one or more data values for each parameter that defines a pre-fetch measure of a resource 105 and uses the values to determine whether the pre-fetch measure exceeds a threshold measure. For example, the system 100 can use an example comparator to compare or analyze each of the parameter values against a corresponding threshold value that defines the threshold measure. In some implementations, system 100 stores a set of threshold values that define the threshold measure, where discrete values in the set correspond to each of the criticality, freshness, stability, parameters.

For each respective resource that is determined to have a pre-fetch measure that exceeds a threshold measure, system 100 determines whether an age of the respective resource exceeds a threshold age (208). For example, system 100 compares a criticality parameter value (e.g., 0.8) for a resource 105 to a corresponding threshold value (e.g., 0.3).

In some cases, the criticality value for a resource 105 indicates relevance of the resource 105 based on a quantity or percentage of webpages that each use the resource 105. For example, a resource 105 that has a criticality value of 0.8 indicates that 80% of the webpages in a given set each use the resource 105 to render graphical content when the webpage is requested by a client device.

System 100 can determine whether a particular resource 105 is a candidate for pre-fetching based on the pre-fetch measure of the resource 105 exceeding the threshold measure. For a resource 105 that is determined to have a pre-fetch measure that exceeds a threshold measure, system 100 determines whether an age of the resource 105 exceeds a threshold age or falls below a threshold age. For a resource 105 that is determined to have an age that exceeds the threshold age, system 100 can generate an index entry that includes a command to pre-fetch the respective resource based on the determination that the age of the resource exceeds the threshold age (210). For example, system 100 can be configured to generate index entries to pre-fetch up to five resources 105 that have been observed in data corpus 118 more than once in the last 7 days, 14 days, 21 days, or 28 days (e.g., based on pre-fetch measure or usage information).

In some implementations, pre-fetching up to five resources for a webpage 104 that was observed more than once in last 7 days provides better, or more optimal, click latency than pre-fetching up to five resources for a webpage 104 that was observed more than once in last 7 21 days. In other implementations, pre-fetching up to three or five resources for a webpage 104 that was observed more than once in last 21 days provides better, or more optimal, click latency than pre-fetching up to three or five resources for a webpage 104 that was observed more than once in last 7 days. The individual index entries that include the respective pre-fetch commands can be stored at a pre-fetch index 112 of system 100, where at least one index entry is generated and stored at the pre-fetch index 112.

Figure 3:
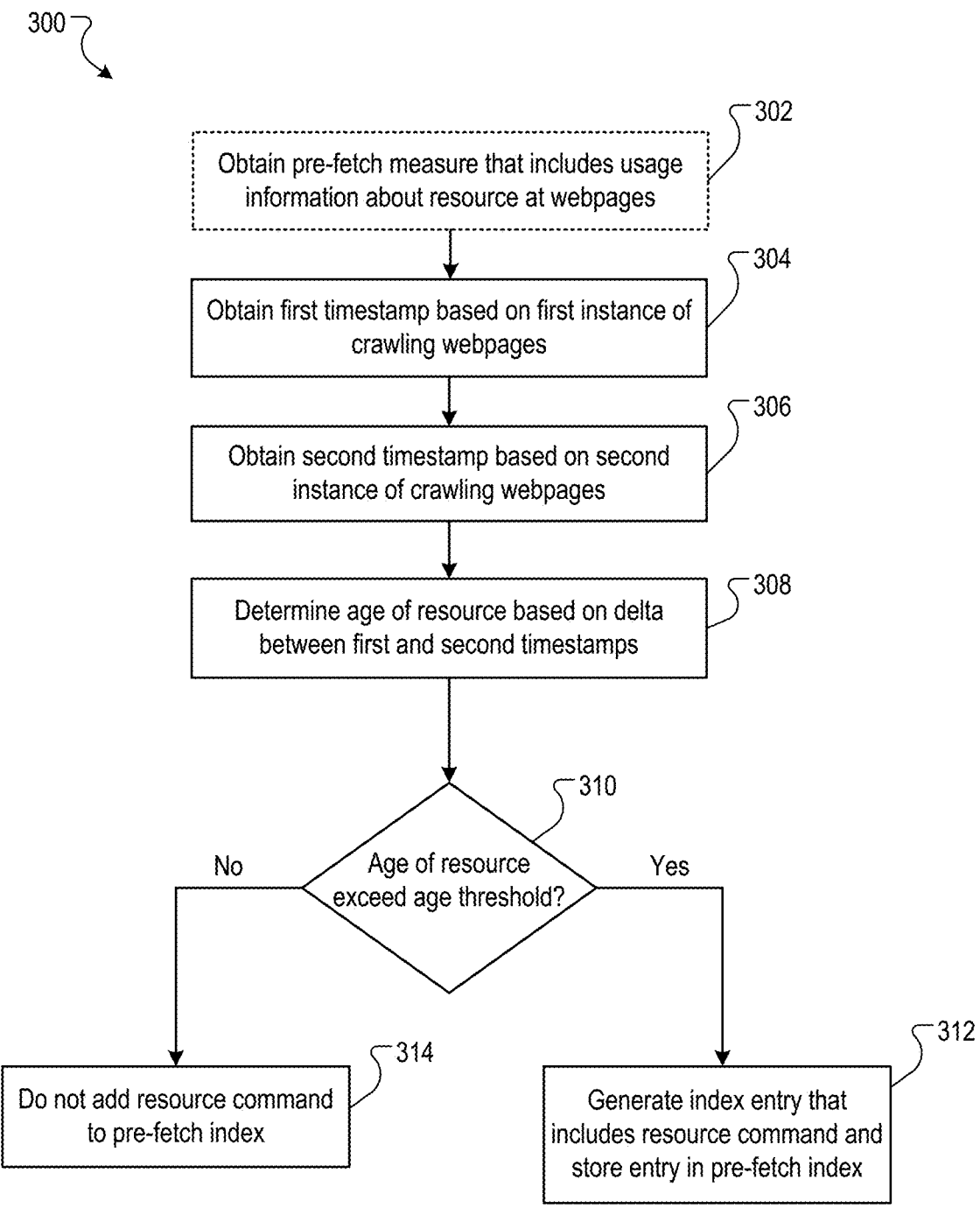
FIG. 3 shows a flowchart of an example process for determining an age of a resource.

FIG. 3 shows a flowchart of an example process 300 for determining an age of a resource. Similar to process 200, process 300 can be performed using the devices and systems described in this document. In some implementations, steps of process 300 are enabled by programmed instructions that are executable by processors and memory of these devices and systems.

Referring now to process 300, processing engine 122 obtains usage information for a resource 105 and determines one or more pre-fetch measures based on the usage information (302). In some implementations, the pre-fetch measure includes the usage information. For example, processing engine 122 can determine a percentage of webpages 104 from among the multiple webpages 104 that each use the resource to render a digital component (e.g., graphical, video or textual data) at a web browser 107 that loads the webpage. Processing engine 122 determines the pre-fetch measure in response to determining that the percentage of webpages exceeds a threshold percentage.

To determine the age of the resource 105, processing engine 122 obtains a first timestamp for the resource 105 based on a time at which the resource 105 is crawled during a first instance of crawling the multiple webpages 104 to identify a set of resources (304). Processing engine 122 obtains a second timestamp for the resource 105 based on a time at which the resource 105 is crawled during a second instance of crawling the multiple webpages 104 to identify the set of resources (306). Processing engine 122 determines the age of the resource 105 by determining a delta between the first and second timestamps (308). For example, if the first timestamp shows a date and time of May 1, 2018, 9:00 am ET, and a second more recent timestamp shows a date and time of May 8, 2018, 10:00 am ET, then an age of the resource 105 is 7 days based on the computed delta. In some implementations, if a resource 105 is used at multiple webpages 104, then the resource 105 will have a respective age at each webpage 104 based on its respective use at each webpage. It will be appreciated that the age of the resource 105 is an observed age as determined by the system 100 rather than an indication of how long the resource has been in existence.

Processing engine 122 determines whether the age of the resource 105 exceeds the threshold age (310) e.g., in response to determining that the percentage of webpages (e.g. 60%) exceeds the threshold percentage (e.g. 40%). If an age (e.g. 3 days) of a resource 105 is determined not to exceed a threshold age (e.g. 6 days), then system 100 does not generate an index entry to pre-fetch the resource (312). However, if an age (e.g. 7 days) is determined to exceed the threshold age (e.g. 6 days), then system 100 uses command generator 120 to generate an index entry that includes a resource pre-fetch command and causes the index entry to be stored in the pre-fetch index (314). The system 100 can then using the command included in the index entry at the pre-fetch index 112 to pre-fetch the resource 105 when a user device 108 submits a request to a webpage 104 that uses the resource 105.

Figure 4:
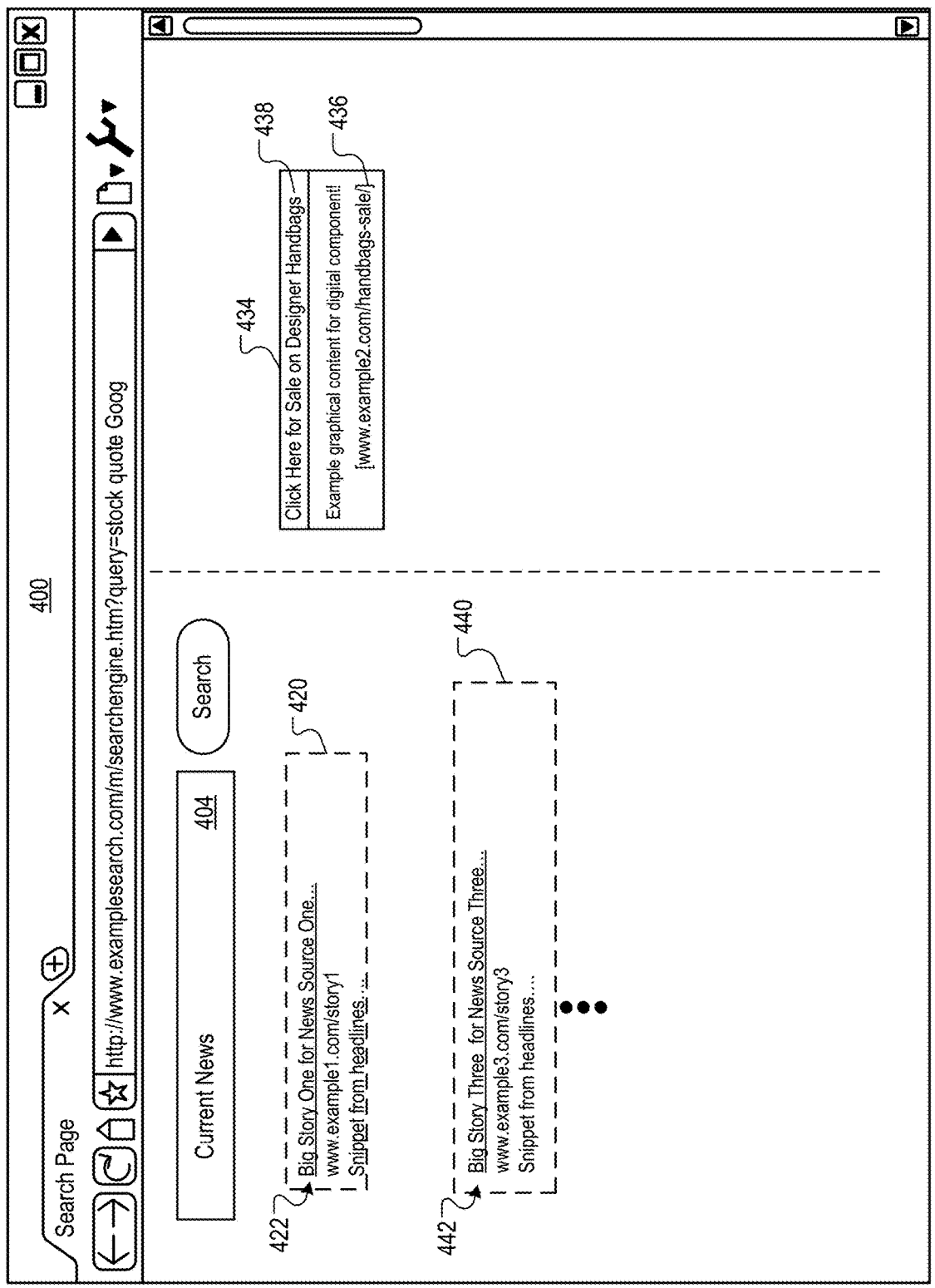
FIG. 4 shows an example graphical interface that includes search results and links to one or more webpages.

FIG. 4 shows an example graphical interface for a search results page 400 generated using an example search engine of system 100. The results page 400 includes search results and links to web sites that include one or more webpages. The search results 420, 430, and 440 are responsive to the query "current news" displayed in the search input field 404. The search results 420 and 440 are web search results generated in response to a search of a web index of addresses for webpages 104 that use resources 105. Each search result 420 and 440 references a URL link to webpage that uses certain resources to render in a browser application 107 on a user device 108 and includes a URL link to the webpage 104, and other data 422 and 442, such as a snippet of text extracted for the referenced webpage.

A digital component 434 can be displayed at the results page 400 as a search result. In some implementations, the digital component includes a snippet 438 of data that may be extracted from the webpage to which a link of the digital component points. In the example of FIG. 4, the snippet 438 is a headline and text of a sale for designer handbags. In some implementations, digital component 434 includes an image to visually distinguish the digital component 434 search result from the other search results displayed at the results page 400. The digital component 434 may correspond to one or more content items displayed at a first webpage, such as search results page 400 generated by a search engine. A user may click on a URL link 436 embedded at the digital component 434 to access a second webpage, such as a landing page.

When the user clicks the link 436, one or more scripted commands associated with the HTML for the landing page is used to speed up navigation to the website that hosts the landing page. For example, a pre-fetch command stored in an index entry of pre-fetch index 112 can be processed by a web-browser 107 to pre-fetch a resource used by the requested the webpage 104. These pre-fetched or cached commands (and/or resources) included in the pre-fetch index 112 enable system 100 to speed up access to the landing page and provide a faster response, relative to other systems, when a user device 108 submits a request to access content of the landing page. For example, a set of webpages can be identified by a search engine in response to a query. Pre-fetch index 112 can include an index entry for one or more resources 105 that are each components of the one or more webpages in the set. Thus, when a search result is created that references a webpage, system 100 accesses the index entry to obtain a command or script that, when processed by a web browser 107 of user device 108, causes the user device 108 to issue a request for the resources 105. The user device 108 performs the action of processing the command obtained from the index entry in response to selection of a search result that links to the webpage.

Accordingly, when user device 108 detects a selection of a search result that references the webpage, in addition to the user device 108 generating an HTTP request for the webpage, the user device will also generate a request to pre-fetch a resource 105 using the command in the index entry. Hence, when the webpage 104 is served to, or processed by, the user device 108 the resources 105 will have already been pre-fetched by that time. This pre-fetch action results in minimal delays, and enables faster access times, when user device 108 seeks to obtain information at the webpage. This is because a portion of the data needed by the webpage 104 is already stored at the user cache.

Figure 5:
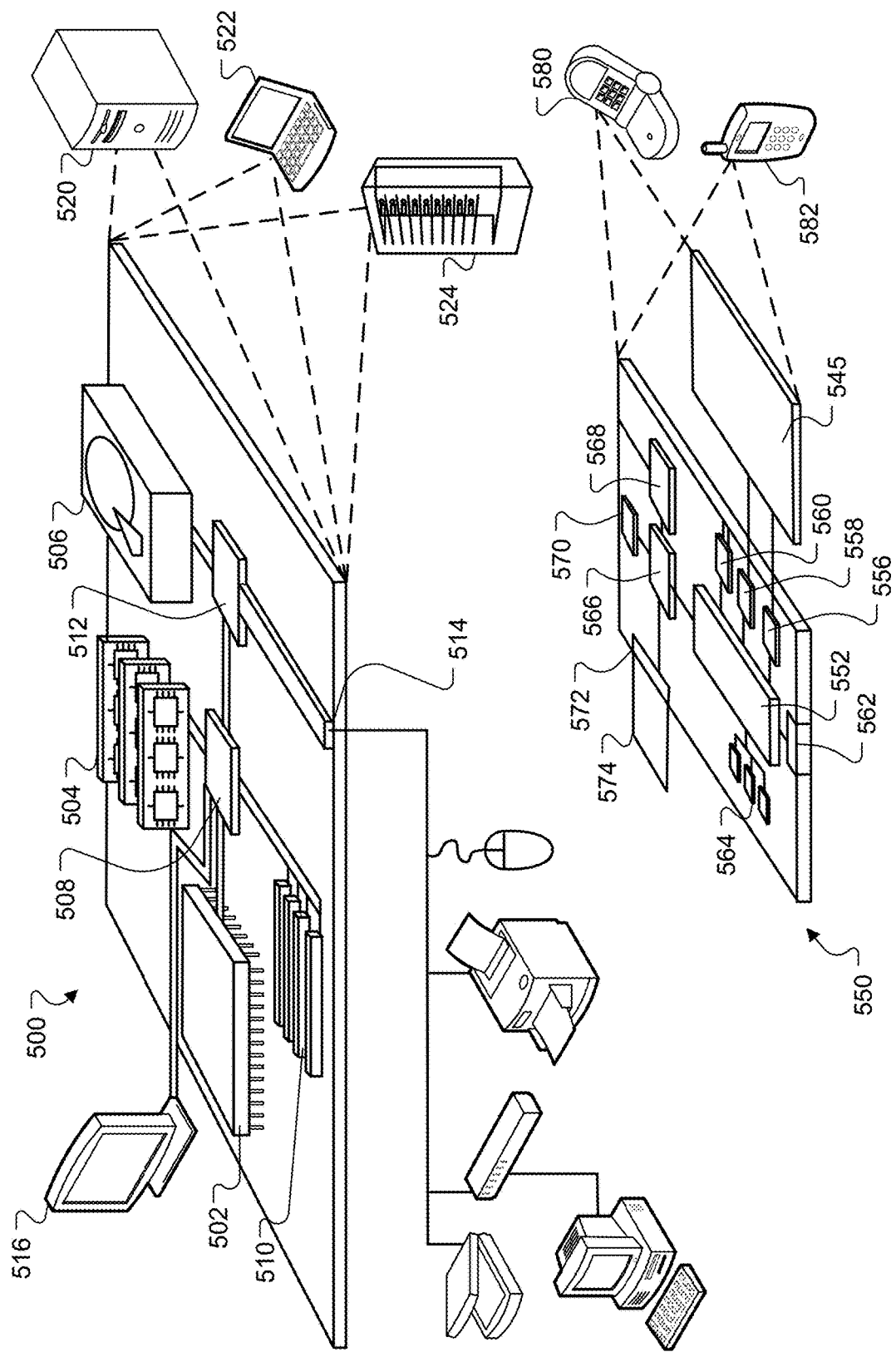
FIG. 5 is a block diagram of an example computing system that can be used in connection with methods described in this specification.

FIG. 5 is a block diagram of computing devices 500, 550 that may be used to implement the systems and methods described in this document, as either a client or as a server or multiple servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document. Computing devices 500, 550 can be example devices whose physical design and system operation requirements are advantageously impacted by implementation of the techniques described above.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units. The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations.

In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502. In some implementations, the instructions are included in program code executed using pre-fetch system 100. For example, processor 502 executes the instructions to cause one or more functions of web crawler 116, processing engine 122, and command generator 120 to be performed.

The high speed controller 508 manages bandwidth-intensive operations for the computing device 500, while the low speed controller 512 manages lower bandwidth-intensive operations. Such allocation of duties is exemplary only. In some implementations, high-speed controller 512 can be a special-purpose hardware circuit with design features that improve performance of data analysis and other analytical functions of system 100. For example, high-speed controller 508 can be implemented at pre-fetch system 110 to uniquely manage analysis of data corpus 118 and dataflow between processing engine 122 and one or more of command generator 120, pre-fetch index 112, and rendering system 114. Specific design features of controller 508 can enable system 100 to quickly and efficiently obtain usage information for determining an age of a resource 105 or for determining a pre-fetch measure of the resource.

In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components.

The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the following claims. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
providing, by a client device, a search query to a search system;
receiving, from the search system, a set of search results that are responsive to the search query, each search result including a link to a webpage, and wherein each webpage references one or more resources, each of the one or more resources being a component of the webpage, and wherein the webpage uses the one or more resources to present content;
wherein at least one search result includes a pre-fetch command that is accessed by a web browser on the client device before a user selects the search result, wherein the pre-fetch command causes the web browser to pre-fetch one or more resources referenced by the webpage linked to by the search result, and wherein each of the one or more resources that are pre-fetched is a resource for which the search system has:
determined an age of the resource using a timestamp for the resource that indicates a time that the webpage was previously crawled to identify the resource as a component of the webpage,
determined a pre-fetch measure of the resource based on the age of the resource and usage information that describes use of the resource by one or more webpages, and
determined that the pre-fetch measure exceeds a threshold measure and determined the age of the resource exceeds a threshold age;
receiving, at the client device, data from the one or more resources in response to the web browser executing the pre-fetch command;
after receiving the data from the one or more resources in response to the web browser executing the pre-fetch command, receiving, by the user, a selection of the at least one search result;
requesting, by the web browser, the webpage referenced by the at least one search result in response to the selection of the at least one search result; and
presenting the webpage at the client device by accessing and presenting the data received from the one or more resources in response to the web browser executing the pre-fetch command.

2. The method of claim 1, wherein the pre-fetch measure of the resource is determined by:
obtaining the usage information that describes the use of the resource by the one or more webpages; and
determining a position of the resource at a webpage using the obtained usage information, wherein the webpage is not included in the webpages that were previously crawled.

3. The method of claim 2, wherein the position of the resource is determined by:
providing, to a rendering system, program code for rendering a first webpage from among the webpages that were previously crawled;
obtaining usage information that describes use of the resource by a second webpage that is rendered using the rendering system; and
determining the position of the resource relative to at least one element that is viewable at the second webpage.

4. The method of claim 1, wherein the pre-fetch measure of the resource is determined by:

determining a measure of stability of the resource based on a rate at which an attribute of the resource changes during a predefined time period; and determining the pre-fetch measure of the resource based on the determined measure of stability of the resource.

5. The method of claim 1, wherein the pre-fetch measure for a resource is determined by:

determining a percentage of webpages from the webpages that use the resource to render a digital component at a web browser that loads the webpage; and determining whether the percentage of webpages exceeds a threshold percentage.

6. The method of claim 1, wherein the age of the resource is determined by:

obtaining a first timestamp for the resource based on a first instance of crawling the webpages;

obtaining a second timestamp for the resource based on a second instance of crawling the webpages; and determining the age of the resource by determining a delta between the first and second timestamps.

7. A client device system, comprising:

one or more processing devices; and one or more non-transitory machine-readable storage devices storing instructions that are executable by the one or more processing devices to cause performance of operations comprising:

providing, by a client device, a search query to a search system;

receiving, from the search system, a set of search results that are responsive to the query, each search result including a link to a webpage, and wherein each webpage references one or more resources, each of the one or more resources being a component of the webpage, and wherein the webpage uses the one or more resources to present content;

wherein at least one search result includes a pre-fetch command that is accessed by a web browser on the client device before a user selects the search result, wherein the pre-fetch command causes the web browser to pre-fetch one or more resources referenced by the webpage linked to by the search result, and wherein each of the one or more resources that are pre-fetched is a resource for which the search system has:

determined an age of the resource using a timestamp for the resource that indicates a time that the webpage was previously crawled to identify the resource as a component of the webpage, determined a pre-fetch measure of the resource based on the age of the resource and usage information that describes use of the resource by one or more webpages, and determined that the pre-fetch measure exceeds a threshold measure and determined the age of the resource exceeds a threshold age;

receiving, at the client device, data from the one or more resources in response to the web browser executing the pre-fetch command;

after receiving the data from the one or more resources in response to the web browser executing the pre-fetch command, receiving, by the user, a selection of the at least one search result;

requesting, by the web browser, the webpage referenced by the at least one search result in response to the selection of the at least one search result; and presenting the webpage at the client device by accessing and presenting the data received from the one or more resources in response to the web browser executing the pre-fetch command.

8. The system of claim 7, wherein the pre-fetch measure of the resource is determined by:

obtaining the usage information that describes the use of the resource by the one or more webpages; and determining a position of the resource at a webpage using the obtained usage information, wherein the webpage is not included in the webpages that were previously crawled.

9. The system of claim 8, wherein the position of the resource is determined by:

providing, to a rendering system, program code for rendering a first webpage from among the webpages that were previously crawled;

obtaining usage information that describes use of the resource by a second webpage that is rendered using the rendering system; and determining the position of the resource relative to at least one element that is viewable at the second webpage.

10. The system of claim 7, wherein the pre-fetch measure of the resource is determined by:

determining a measure of stability of the resource based on a rate at which an attribute of the resource changes during a predefined time period; and determining the pre-fetch measure of the resource based on the determined measure of stability of the resource.

11. The system of claim 7, wherein the pre-fetch measure for a resource is determined by:

determining a percentage of webpages from the webpages that use the resource to render a digital component at a web browser that loads the webpage; and determining whether the percentage of webpages exceeds a threshold percentage.

12. The system of claim 7, wherein the age of the resource is determined by:

obtaining a first timestamp for the resource based on a first instance of crawling the webpages;

obtaining a second timestamp for the resource based on a second instance of crawling the webpages; and determining the age of the resource by determining a delta between the first and second timestamps.

13. One or more non-transitory machine-readable storage devices storing instructions that are executable by one or more processing devices to cause performance of operations comprising:

providing, by a client device, a search query to a search system;

receiving, from the search system, a set of search results that are responsive to the query, each search result including a link to a webpage, and wherein each webpage references one or more resources, each of the one or more resources being a component of the webpage, and wherein the webpage uses the one or more resources to present content;

wherein at least one search result includes a pre-fetch command that is accessed by a web browser on the client device before a user selects the search result, wherein the pre-fetch command causes the web browser to pre-fetch one or more resources referenced by the webpage linked to by the search result, and wherein each of the one or more resources that are pre-fetched is a resource for which the search system has:

determined an age of the resource using a timestamp for the resource that indicates a time that the webpage was previously crawled to identify the resource as a component of the webpage, determined a pre-fetch measure of the resource based on the age of the resource and usage information that describes use of the resource by one or more webpages, and determined that the pre-fetch measure exceeds a threshold measure and determined the age of the resource exceeds a threshold age;

receiving, at the client device, data from the one or more resources in response to the web browser executing the pre-fetch command;

after receiving the data from the one or more resources in response to the web browser executing the pre-fetch command, receiving, by the user, a selection of the at least one search result;

requesting, by the web browser, the webpage referenced by the at least one search result in response to the selection of the at least one search result; and presenting the webpage at the client device by accessing and presenting the data received from the one or more resources in response to the web browser executing the pre-fetch command.

* * * * *

UNITED STATES PATENT AND TRADEMARK OFFICE
CERTIFICATE OF CORRECTION

| | |
|---|---|
| PATENT NO. | : 11,720,407 B2 |
| APPLICATION NO. | : 17/721611 |
| DATED | : August 8, 2023 |
| INVENTOR(S) | : Suleman |

It is certified that error appears in the above-identified patent and that said Letters Patent is hereby corrected as shown below:

On the Title Page

On Page 2, Column 2, Item (56), under "OTHER PUBLICATIONS", Line 8, "Grigoril" and insert --Grigorik--, therefor.

On Page 2, Column 2, Item (56), under "OTHER PUBLICATIONS", Line 16, delete "PCTAJS2018/000361," and insert --PCT/US2018/000361,--, therefor.

On Page 2, Column 2, Item (56), under "OTHER PUBLICATIONS", Line 18, "SlahEldeen" and insert --SalahEldeen--, therefor.

Signed and Sealed this
Fifth Day of November, 2024

Katherine Kelly Vidal
*Director of the United States Patent and Trademark Office*